United States Patent [19]
Rubin

[11] Patent Number: 6,012,770
[45] Date of Patent: Jan. 11, 2000

[54] SEAT COVER IN STRAP OF A MOTORCYCLE SEAT

[76] Inventor: Robert Rubin, 39-24 213 St., Bayside, N.Y. 11361

[21] Appl. No.: 09/053,671

[22] Filed: Apr. 1, 1998

Related U.S. Application Data

[60] Provisional application No. 60/072,613, Jan. 26, 1998.

[51] Int. Cl.$^7$ ...................................................... A47C 7/66
[52] U.S. Cl. .................................. 297/184.11; 297/184.1; 297/195.1; 297/219.11
[58] Field of Search ........................... 297/184.11, 184.1, 297/219.11, 195.1

[56] References Cited

U.S. PATENT DOCUMENTS

| | | | |
|---|---|---|---|
| 3,537,746 | 11/1970 | Peters | 296/78.1 |
| 3,836,196 | 9/1974 | Hu | 297/219.11 |
| 3,884,523 | 5/1975 | Allen | 296/136 |
| 4,171,145 | 10/1979 | Pearson | 296/78.1 |
| 4,290,644 | 9/1981 | Hu et al. | 297/195.1 |
| 4,320,922 | 3/1982 | Meritis | 297/184.11 X |
| 5,080,431 | 1/1992 | Frazier | 297/184.11 |
| 5,308,139 | 5/1994 | Rieger | 297/184.11 |
| 5,588,698 | 12/1996 | Hsueh | 297/184.11 |

FOREIGN PATENT DOCUMENTS

| | | |
|---|---|---|
| 8900413 | 9/1990 | Netherlands . |
| 214016 | 4/1924 | United Kingdom . |

*Primary Examiner*—Peter M. Cuomo
*Assistant Examiner*—Rodney B. White
*Attorney, Agent, or Firm*—Ostrolenk, Faber, Gerb & Soffen, LLP

[57] ABSTRACT

On the seat of a motorcycle, a strap, typically located between the front and rear seats of the motorcycle seat, may be grasped by the rear seat passenger. A cover for the entire seat is stowed in a pocket in the strap. The pocket is openable to permit deployment of the cover over the seat and the cover may be re-stowed within the pocket in the strap. Closure elements close the pocket of the strap.

20 Claims, 3 Drawing Sheets

SEAT COVER IN STRAP OF A MOTORCYCLE SEAT

This application is based on, and claims priority to, U.S. Provisional Patent Application No. 60/072,613 filed Jan. 26, 1998, entitled SEAT COVER IN STRAP FOR MOTORCYCLE SEAT.

BACKGROUND OF THE INVENTION

The present invention relates to a seat cover for a motorcycle seat and to the storage of the cover.

A motorcycle seat may be exposed to the elements, like rain, and dirt, which may damage the seat, or sun which makes the seat quite hot.

A cover for the seat is primarily for covering the seat when the motorcycle is not in use. There are various known covers: a cover stored on the seat within a closed covering, as in U.S. Pat. No. 3,836,196; a cover retained in a container below the seat, to be drawn out of the container when needed, as in U.S. Pat. No. 5,080,431, British Patent 214,016 and Netherlands Patent 890,413; a cover stored in the seat, as in U.S. Pat. No. 4,290,644. A cover may cover not only the seat but the entire motorcycle, as in U.S. Pat. No. 3,884,523. Further, a seat cover may be drawn from a container located near the seat, as in U.S. Pat. Nos. 4,171,145, 3,537,746 and 5,588,698. In all cases, easy access to and ease of storage of the cover when not in use are desired. Several of the covers noted above are cumbersome to deploy, require extra apparatus be provided at the seat and/or at the motorcycle body and it may be difficult to return the cover to storage after it has been spread over the seat.

SUMMARY OF THE INVENTION

It is an object of the present invention to provide an easily accessible seat cover which can be easily placed over a motorcycle seat. Another object of the invention is to ease storage, deployment and return to storage of the seat cover. A further object to the invention is to avoid need for use of additional devices for support, storage and deployment of the cover.

Although the invention is described for use on a motorcycle seat, the present invention is adapted for use on any vehicle having a front rider seat with a strap extending across the seat, e.g. a bicycle, an all-terrain vehicle with more than two wheels, any other ridable vehicle with the seat having a strap thereon and wherein the seat should be periodically covered.

A typical motorcycle seat has two seats, a front seat for the driver and a rear seat for a passenger. The two seats are typically integrated as one. The typical motorcycle seat has a strong strap located at the front of the rear seat, extending across the seat, secured at opposite sides of the seat and graspable by the hand of the rear passenger to support himself on the rear seat. The strap is fastened to the frame of the motorcycle below the seat at opposite sides of the seat in the usual manner for such straps.

The strap of the invention may be configured to store a cover for the seat, to ease deployment of the cover from the strap over the seat and to ease re-stowage of the cover in the strap when the cover is not required. The strap in which the invention is incorporated is applicable to all types of vehicle seats where a rider sits on the seat and there is a strap extending across the width of the seat. Because the strap typically is positioned between the front end of the front seat and the rear end of the rear seat, a cover is in or at the strap and is shaped and sized to include a front seat cover to cover the front seat forward of the strap and a rear seat cover to cover the rear seat rearward of the strap. Each of the front and rear seat covers may be separately deployed out of the strap and returned for storage. The strap may include a pocket that receives the cover and the pocket can be closed in any one of several ways, including a Velcro-type fastener, a zipper, a snap connection or simple overlapped layers of material.

The cover is made of any flexible material, such as a textile, a fabric of artificial or synthesized materials, such as vinyl, a plastic sheet, any non-woven, a foil etc., which is capable of being held on the front and rear seats, which will protect the seats against damage from the environment, which can be easily deployed from and easily restowed in the strap. The cover may have an elastic band or a drawstring around its periphery, or a hook, or snaps, etc. to hold it to the periphery of the seat. The cover may be merely ornamental, or may be covered with appropriate surface ornamentation for decoration or advertising purposes. It may be designed to be sat upon and to also make the seat more comfortable.

The strap should be of such size, of such material and be strong enough as to perform its usual main function of supporting a rider who grasps the strap while sitting on the rear seat. The strap is configured with storage space in or on it for the cover, e.g. flaps that are closed over the cover and that are easily openable, e.g. by a simple fastening of the flaps, to permit the cover to be deployed, or a pouch for the cover in the strap. The cover is permanently secured to the strap, e.g. by being stitched in and along the pocket, so that the strap defines the position of the cover over both of the front and rear seats.

The cover may be deployed from the strap to protect the entire seat when the motorcycle is not in use or to protect just the passenger's rear seat when that seat is not in use. The cover could be held in the strap and deployed from the strap for covering the seat on which either rider is riding. The rider still can hold the strap, while the cover deployed from the strap would protect the seat or the rider on it and perhaps make the seat more comfortable.

Other objects and features of the present invention will become apparent from the following description of the invention which refers to the accompanying drawings.

DESCRIPTION OF THE PREFERRED EMBODIMENT

Figure 1:
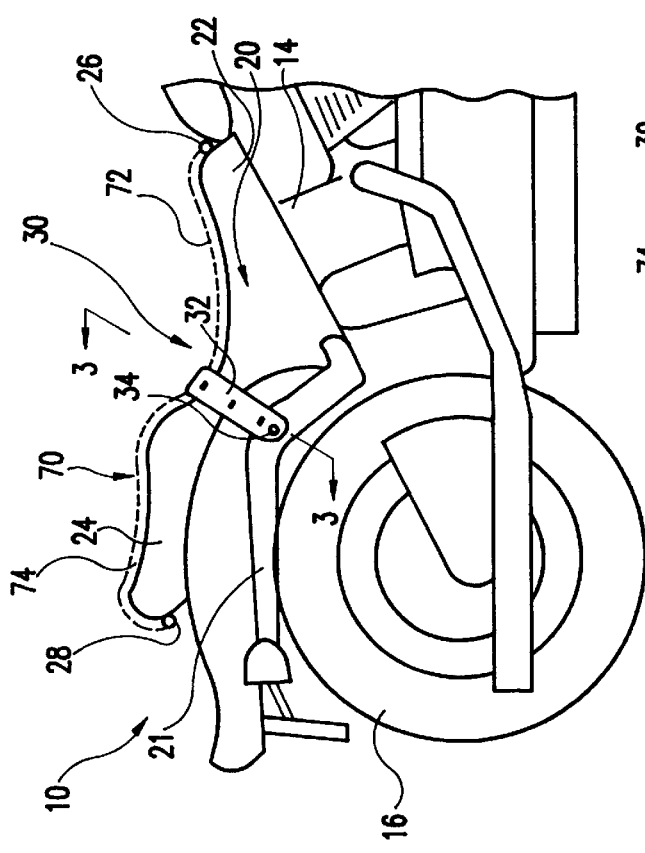
FIG. 1 is an elevational view of the rear part of a conventional motorcycle with a seat provided with the strap and a seat cover according to the present invention.

FIG. 1 shows the rear part of a conventional two-wheel motorcycle 10, which includes a frame and body portion 14 of the motorcycle, a rear wheel 16, a rear wheel fender 18 and a motorcycle seat 20 supported above the frame and the fender 18.

The frame includes a rigid front to back beam portion 21 below the seat 20 to which the below described strap 30 is secured. Alternatively, there are bolts (not shown) projecting laterally outward of the frame and beneath the seat to which the strap may be secured.

The motorcycle seat 20 includes a front seat 22 for the driver and a rear seat 24 for the passenger. Although the passenger's seat 24 is integrated as one seat with and also higher than the driver's seat 22, the seat design is not the subject of this invention. The front seat 22 has a front end 26 and the rear seat 24 has a rear end 28. As is conventional in numerous motorcycles having front and rear seats, there is a strap 30, here a strap according to the invention, located just forward of the rear seat.

Figure 3:
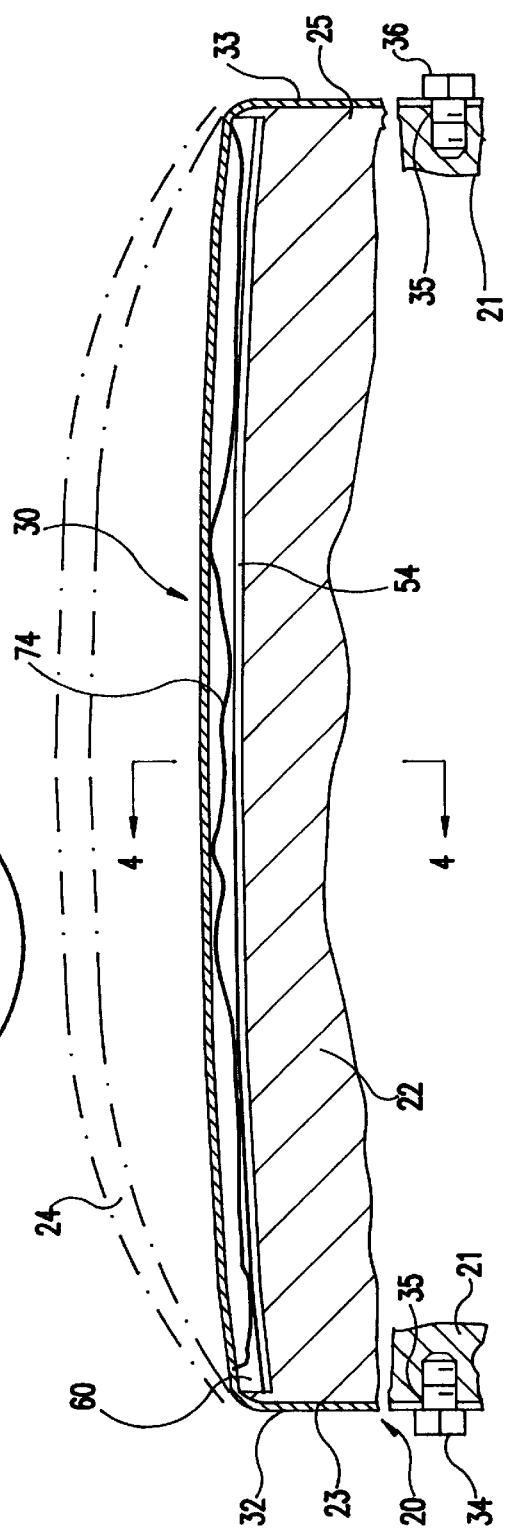
FIG. 3 is a transverse cross-section view along line 3—3 in FIG. 1 and in the rearward direction of the arrows showing the strap on the seat with the cover stored in the strap.
Figure 2:
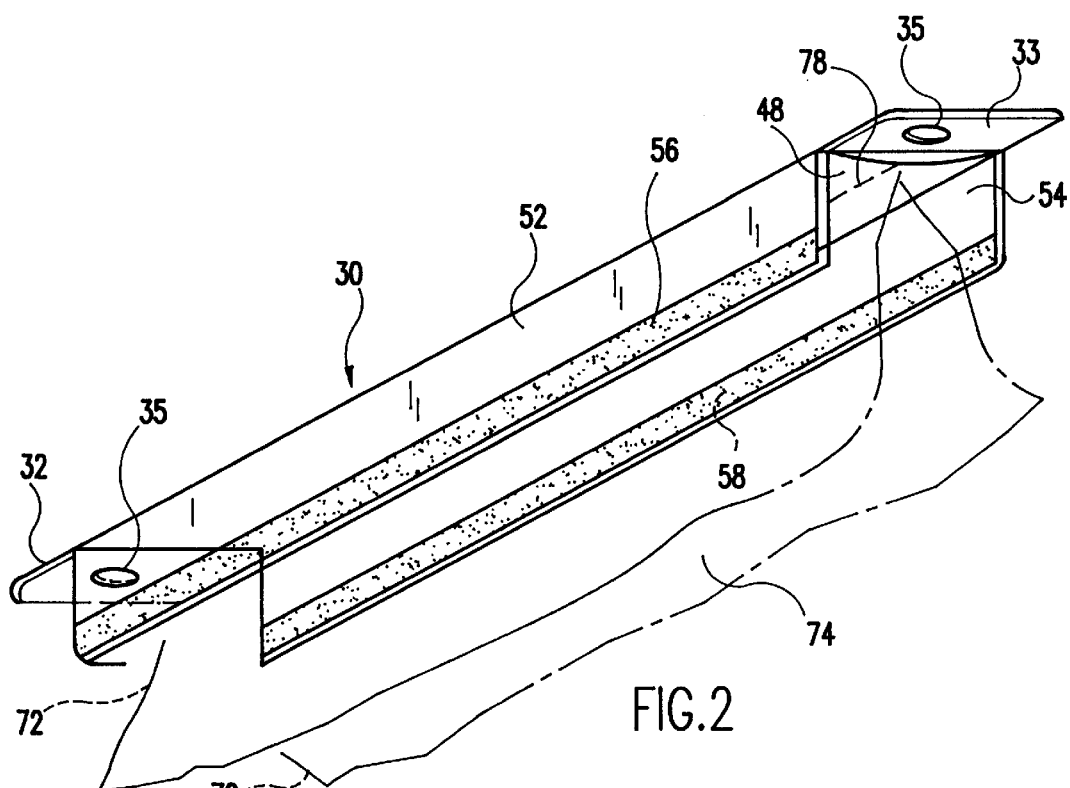
FIG. 2 is a front side, bottom perspective view of one embodiment of the strap for the seat cover.

As seen in FIG. 3, the strap extends across the width of the seat 20. As seen in FIG. 2, the strap 30 includes the end flaps 32, 33 with respective holes 35 therein for receiving fastening elements 34, 36. The strap is fastened to the frame elements 21 below the seat 20 by fastening element 34 below one side 23 of the seat and by fastening element 36 below the opposite side 25 of the seat as the fastening elements extend into openings in the frame elements. The strap is fastened securely by the fastening elements 34 and 36 and is thereby held tightly against the surface of the seat, but with enough play to enable the passenger's hands to wrap around the strap. The frame includes bolts that face outwardly beneath the seat at both sides and the strap may be attached to the frame at those bolts.

Figure 5:
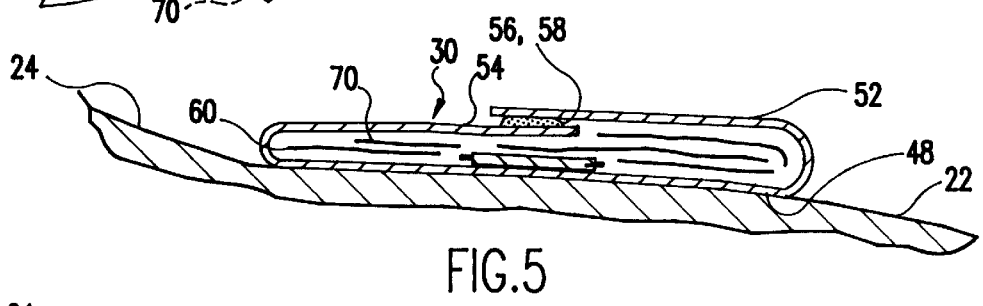
FIG. 5 is the same type of view as FIG. 4 with the strap in an alternate orientation.
Figure 4:
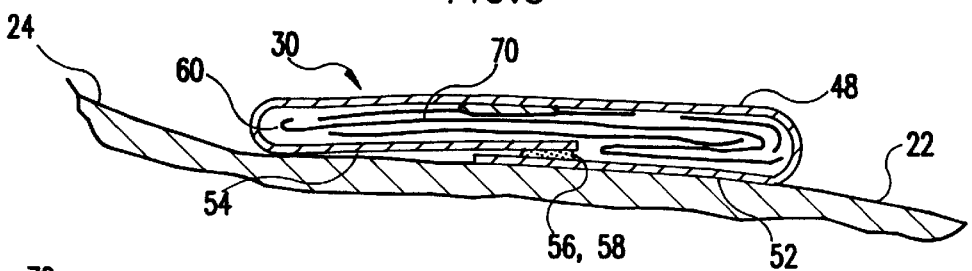
FIG. 4 is a fragmentary view in the direction of arrows 4 in FIG. 3 showing a cross-section of the strap with the cover stored.

The strap embodiment 30 illustrated in FIG. 2 as viewed from below and in FIG. 4 includes the main panel 48 which becomes the top side when the strap is closed and includes two side panels 52, 54 joined to sides of the main panel 48. As seen in FIG. 4, the two side panels are each shorter than the main panel 48. The bottom edge region 56 of the panel 52 and the bottom edge region 58 of the panel 54 are respectively provided with cover closure elements shown as hook and loop fasteners, which are known under the trademark VELCRO. When those panels 52 and 54 are overlaid with their edge regions 56 and 58 atop one another, the strap is enclosed to define an internal pocket 60 for the below described cover. As seen in FIGS. 2 and 5, the strap can be opened, which permits deployment or reinsertion for storage of the cover. While the hook and loop fastener is illustrated, any other known fastener may be substituted, such as a zipper, snaps, ties, etc. Also, although the closing panels are illustrated at the bottom side of the strap 30 in FIGS. 2 and 4, the strap may be inverted so that the opening for access to the cover may be on the top side, as shown in FIG. 5. What is significant here is that the cover is held on or in the strap that extends across the seat. The strap is typically made of leather but may be made of any other sufficiently strong material and which is able to retain the cover for deployment.

Figure 6:
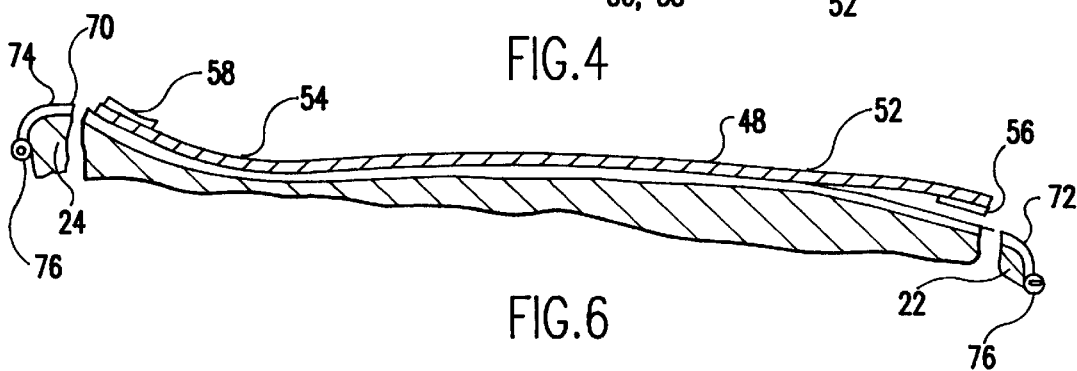
FIG. 6 is a view in the same direction as FIG. 4, showing the strap open and the cover deployed on the seat.

The cover 70 is of a flexible fabric selected from any appropriate fabric able to protect the seat against environmental elements, against wear, etc. including textile, woven or unwoven, a resinous fabric, like vinyl, a plastic, metal foil, etc., so long as the cover is flexible for enabling its storage in the strap and its deployment over the seat and it provides the desired extent of protection. The strap and cover have an additional benefit that it will enable almost any color or pattern or logo type or a decoration to be provided on the cover. The cover stored within the strap is folded or crumpled to fit the pocket 60 of the strap, as illustrated in FIG. 4. When the flaps 52 and 54 of the strap are opened apart, as in FIG. 6, the cover 70 is deployed out of the strap and over the seat, with the front part 72 of the cover extending over the front seat 22 and the rear part 74 of the cover extending over the rear seat 24. The width of the cover is sufficient to extend beyond the width of the seat and cover over the sides 23 and 25 of the seat 20, 22, 24. The length of the cover is sufficient to extend over the length of the seat from the front end 26 to the rear end 28. To hold the cover end 22 securely on the seat, it may have a peripheral elastic strip 76, a draw string, a tie, or the like to hold the periphery of the cover securely on the seat, yet enable removal of the cover for re-stowage within the strap. As an alternative, an appropriate hook or hooks may be attached to the front and rear of the cover to secure it to the front and rear seats. Other arrangements for securing the cover on the seat should be apparent. To properly place the cover, the cover is secured, e.g. by one row of stitching at 78 or two rows of stitching to the panel 48 of the strap so that the front part 72 and the rear part 74 will extend the correct distance over their respective seats.

For deploying the cover, the strap pocket is opened and the front and rear parts of the cover 72 and 74 are removed from the strap and installed over their seats. To re-stow the cover within the strap, its front and rear parts are removed from the seat and are folded or crumpled to fit within the strap, which is then reclosed. The strap need not be released from or removed from the seat in order to deploy or re-stow the cover. No additional devices or apparatus need be provided on the seat or the motorcycle for holding or deploying the cover.

A typical leather strap is approximately 28 inches long and about 1¼ inches wide. The cover stowed in the strap is stretchable to the front and the rear of the seat 20 to be approximately 33 inches in length to cover the entire seat and will be as wide as the seat and the strap.

Figure 7:
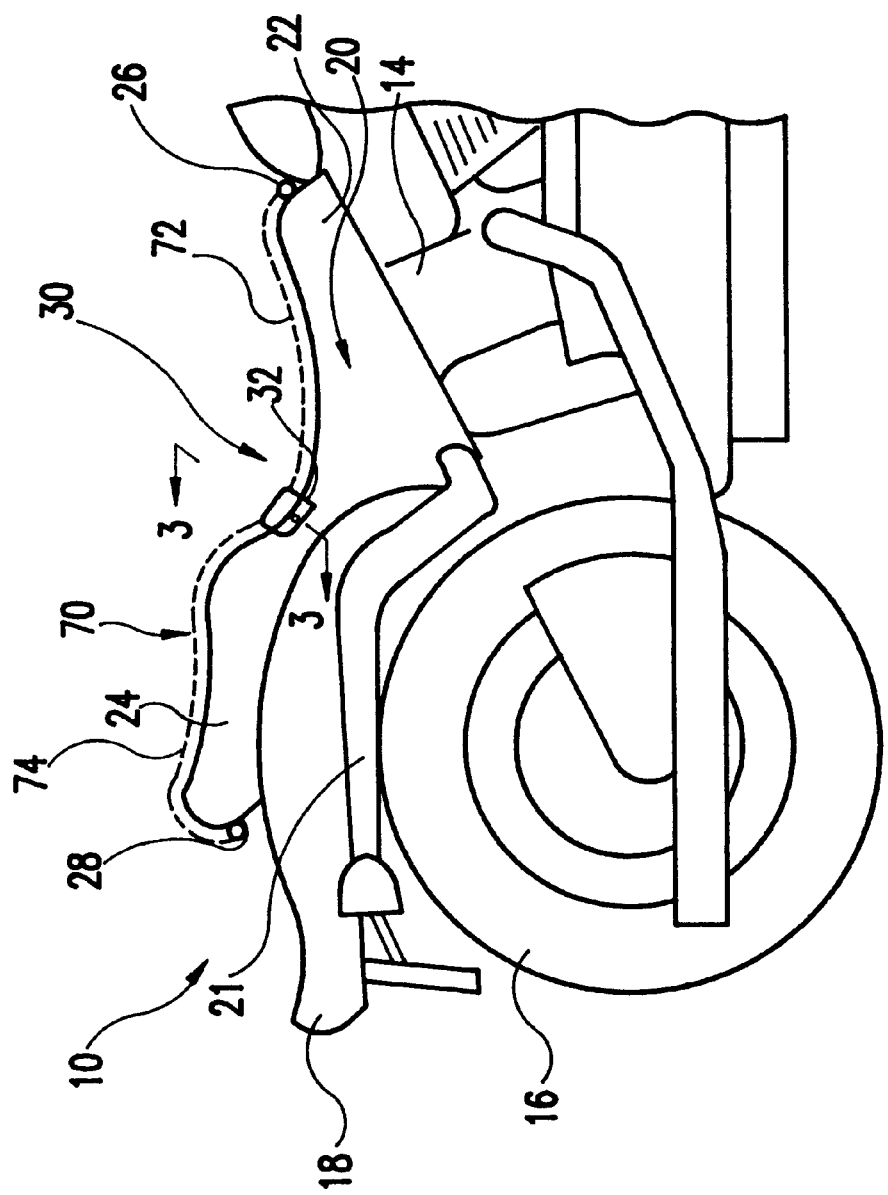
FIG. 7 is a view like FIG. 1 showing a variation in the manner of attaching the strap to the motorcycle.

Although the strap is described herein as attached to the motorcycle frame below the seat, the strap may be attached anywhere on the motorcycle so long as it is stretched across the seat to be grasped by the passenger. In one example, the ends of the strap are attached to the lateral sides of the seat shortly below the seat surface, whereby the strap is supported on the seat and is thereby indirectly attached to the frame via the seat. FIG. 7 illustrates that design using the same reference numbers and elements as in FIG. 1, except that the strap is at the seat.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cover and strap combination for a coverable seat for a vehicle, the combination comprising:

a strap for extending across an upper surface of the seat in a lateral direction from one lateral side of the seat to an opposing lateral side of the seat, and the strap is for being secured to the vehicle and across the seat, the strap being so shaped and of such strength and so secured as to be graspable by a rider on the seat, whose hand may wrap the strap;

a cover for the seat; and means for receiving and storing the cover at the strap and including means for enabling the cover to be drawn from the strap at the seat to be deployed transversely to the lateral direction and over the seat.

2. The combination of claim 1, wherein the means for receiving and storing the cover at the strap includes a pocket in the strap, the pocket being closeable to contain the cover therein and being openable to release the cover from the pocket to be deployed over the seat.

3. The combination of claim 2, further comprising closure elements on the strap for closing the pocket with the cover in the pocket.

4. The combination of claim 1, further comprising the cover being of a size and shape to cover over the seat when the cover is deployed.

5. The combination of claim 4, further comprising cover securing means at the periphery of the cover for securing the cover around the seat for covering the seat, and the cover securing means enabling the cover to be installed on the seat and to be removed from the seat for enabling re-stowage of the cover at the strap.

6. The combination of claim 1, wherein the vehicle seat comprises a front and a rear seat and the strap is secured at the vehicle seat between the front and rear seats.

7. The combination of claim 6, wherein the cover is secured at the strap and the cover has a front part which when deployed extends over the front part of the seat and the cover has a rear part which when deployed extends over the rear part of the seat.

8. The combination of claim 6, wherein the strap is of a length to include ends which extend below the vehicle seat to be secured below the seat by the ends of the strap.

9. The combination of claim 1, wherein the strap is of a length to include ends which extend below the vehicle seat to be secured below the seat by the ends of the strap.

10. The combination of claim 1, wherein the cover is secured at the strap so that the strap holds the cover deployed over the seat.

11. A cover and strap combination for a coverable seat for a vehicle, the combination comprising:

a cover for the seat;

a strap for extending across the seat in the lateral direction from one lateral side of the seat to an opposing lateral side of the seat and the strap is for being secured to the vehicle seat, the strap being so shaped and of such strength and so secured as to be graspable by a rider on the seat, whose hand may wrap the strap, the strap including means for receiving and storing the cover at the strap and including means enabling the cover to be drawn from the strap at the seat to be deployed transversely to the lateral direction and over the seat.

12. In combination, a coverable seat for a vehicle and a cover and strap combination for the seat, wherein the seat includes a seating surface, opposed lateral sides of the seating surface and a front and back;

a cover for the seat;

a strap extending across an upper surface of the seat in the lateral direction from one lateral side of the seat to the other lateral side of the seat and the strap is secured to the vehicle at the seat, the strap being so shaped and of such strength and so secured as to be graspable by a rider on the seat, whose hand may wrap the strap, the strap including means for receiving and storing the cover at the strap and including means enabling the cover to be drawn from the strap at the seat to be deployed transversely to the lateral direction and over the seat.

13. The combination of claim 12, wherein the means for receiving and storing the cover at the strap includes a pocket in the strap, the pocket being closeable to contain the cover therein and being openable to release the cover from the pocket to be deployed over the seat.

14. The combination of claim 13, further comprising closure elements on the cover for closing the pocket with the cover in the pocket.

15. The combination of claim 12, further comprising the cover being of a size and shape to cover over the seat when the cover is deployed; cover securing means at the periphery of the cover for securing the cover around the seat for covering the seat, and the cover securing means enabling the cover to be installed on the seat and to be removed from the seat for enabling re-stowage of the cover at the strap.

16. The combination of claim 12, wherein the vehicle seat comprises a front and a rear seat and the strap is secured at the vehicle seat between the front and rear seats.

17. The combination of claim 16, wherein the cover is secured at the strap and the cover has a front part which extends over the front seat and the cover has a rear part which extends over the rear seat.

18. In combination, a vehicle having a coverable seat for a passenger, and a cover and strap combination for covering the seat, the combination comprising:

a seat including a seating surface, opposing lateral sides of the seating surface, and a front and back;

a cover for the seat; and a strap extending across an upper surface of the seat in the lateral direction from one lateral side of the seat to the other lateral side of the seat and the strap is secured to the vehicle at the seat, the strap being so shaped and of such strength and so secured as to be graspable by a rider on the seat, whose hand may wrap the strap, the strap including means for receiving and storing the cover at the strap and including means enabling the cover to be drawn from the strap at the seat to be deployed transversely to the lateral direction and over the seat.

19. The combination of claim 18, wherein the means for receiving and storing the cover at the strap includes a pocket in the strap, the pocket being closeable to contain the cover therein and being openable to release the cover from the pocket to be deployed over the seat.

20. The combination of claim 18, wherein the vehicle seat comprises a front and a rear seat and the strap is secured at the vehicle seat between the front and rear seats; the cover is secured at the strap and the cover has a front part which extends over the front seat and the cover has a rear part which extends over the rear seat.

* * * * *